United States Patent [19]

Berler

[11] 4,250,771
[45] Feb. 17, 1981

[54] FOOD HOLDER ACCESSORY FOR FOOD PROCESSOR

[76] Inventor: Robert M. Berler, 3 Bruce La., Westport, Conn. 06880

[21] Appl. No.: 12,260

[22] Filed: Feb. 15, 1979

[51] Int. Cl.³ .............................................. B25B 27/00
[52] U.S. Cl. ..................................... 81/3 R; 294/61; 241/282.1
[58] Field of Search ...................... 30/295, 296 A, 323; 81/1 R, 3 R, 3.48, 3.49; 99/645; 294/61, 131; 241/282.1

[56] References Cited

U.S. PATENT DOCUMENTS

| 854,812 | 5/1907 | Dodge | 81/3.48 X |
|---|---|---|---|
| 1,570,306 | 1/1926 | Johnson | 294/61 X |
| 1,970,093 | 8/1934 | Homan | 294/61 |
| 2,360,250 | 10/1944 | Mallard | 81/3 R |
| 2,707,651 | 5/1955 | Ott | 30/323 X |

Primary Examiner—James G. Smith

[57] ABSTRACT

An improved food holder accessory for use with conventional food processing units is provided. The holder, having a plurality of prongs for insertion into the food item to be processed, is adapted to be held in the hand at the other end and to be guided into the processor feed tube. The penetration of holder into the feed tube is limited to prevent the holder end which retains the food from being inserted beyond a safe depth into the processor to preclude said food holding end from engaging and being struck by the rotating element of the food processor.

13 Claims, 13 Drawing Figures

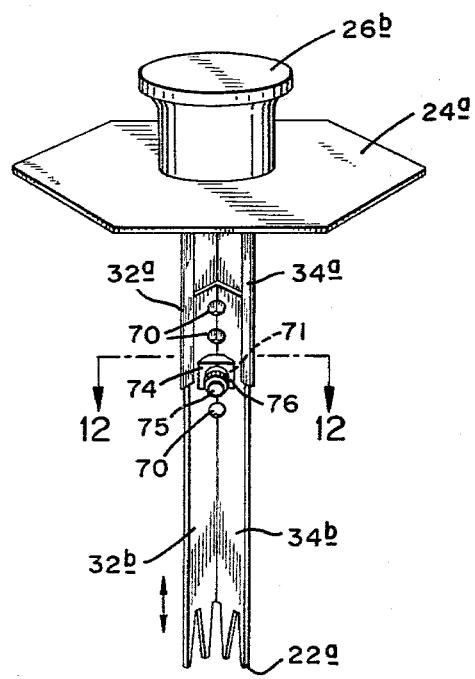
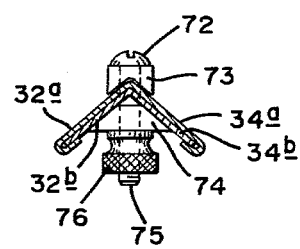
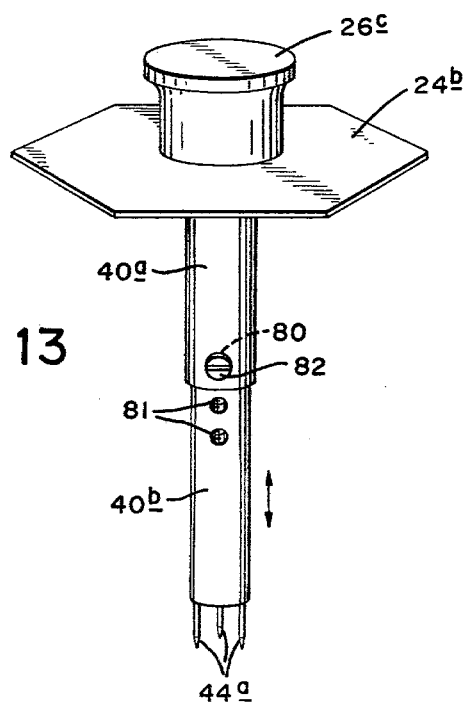

FOOD HOLDER ACCESSORY FOR FOOD PROCESSOR

BACKGROUND OF THE INVENTION

1. Field of the Invention

The use of food processors as kitchen appliances has grown rapidly in recent years. While the design of these food processors differ to some extent from model to model, all of these kitchen type units have essentially the same basic parts; a base which houses a motor to drive the rotating blade and disks, a bowl that fits onto the base and contains the processed food, a pusher to feed food through a feed tube situated on the lid of the bowl and a plurality of elements which engage the food, e.g. for slicing, grating, chopping, blending, and the like.

2. Description of the Prior Art

Heretofore, because of the manner of fabrication of the device, such processors have not practically permitted the slicing or processing of a single food item. In other words, unless the amount of food to be processed was introduced in amounts which substantially filled the cross section of and was neatly stacked in the feed tube so that the pusher forced all the food against the work element simultaneously, the processing of the food item would be uneven, i.e. cut on a bias. Moreover, because of the haphazard manner in which the food item lay in the feed tube when loosely stacked, the processed product obtained would be unsightly.

Attempts have been made to provide a device to hold the food item while it is being sliced and while at least one device is known which attempts to hold a single item while it is being sliced, this device is unsatisfactory in that it cannot be used with various foods, e.g. celery stalks, and is in any case, inadequate in holding power and control. Another arrangement to hold food items in place in the feed tube employs an array of converging spring leaves that are separated and hold an item in place when the item is pressed into the feed tube between the spring leaves. This arrangement is regarded as unsatisfactory because of the hindrance presented when the full cross section of the feed tube is used and for sanitary reasons.

It is thus apparent that a need exists for an improved device for use in conjunction with a food processor which permits an individual food item such as a celery stalk, carrot, cucumber, pepperoni stick and the like, to be held and neatly sliced or otherwise efficiently processed without the food item becoming prematurely dislodged from the holder.

SUMMARY OF THE INVENTION

The present invention provides an improved food holding accessory for use with conventional kitchen food processors to readily permit the holding securely of a food item in a controlled disposition within the feed tube of the processor. The holder of the invention prevents the food item from lying in a haphazard position in the feed tube. It retains the food item rigidly allowing the slicing element of the food processor to efficiently and uniformly process the individual food item without tearing or mutilating. The holder is designed so that when inserted to the hilt, into the feed tube, i.e. after the food item has been processed, there is still clearance between the extremity of the holder and the slicing element or blade to prevent engagement of the two. The holder is preferably fabricated of an easily sanitized material, e.g. stainless steel. The holder may be adjustable in length permitting it to be adaptable to a plurality of different feed tube lengths while still assuring that the extremity of the holder will not come into contact with the rotating processor blade. To prevent accidental rolling of the holder when it is set on its side on a work table, the base of the handle or hilt preferably comprises a shape other than circular, e.g. hexagon or other polygon shape.

BRIEF DESCRIPTION OF THE DRAWING

The invention will be more fully understood and additional features and further advantages will become apparent by reference to the following detailed description of the accompanying drawing in which:

FIG. 11 is a perspective view of an embodiment of the holder with length adjusting features.

FIG. 12 is a cross section view of the embodiment of FIG. 11.

FIG. 13 is a perspective view of alternate adjustable unit.

DETAILED DESCRIPTION OF THE PREFERRED EMBODIMENT

Figure 1:
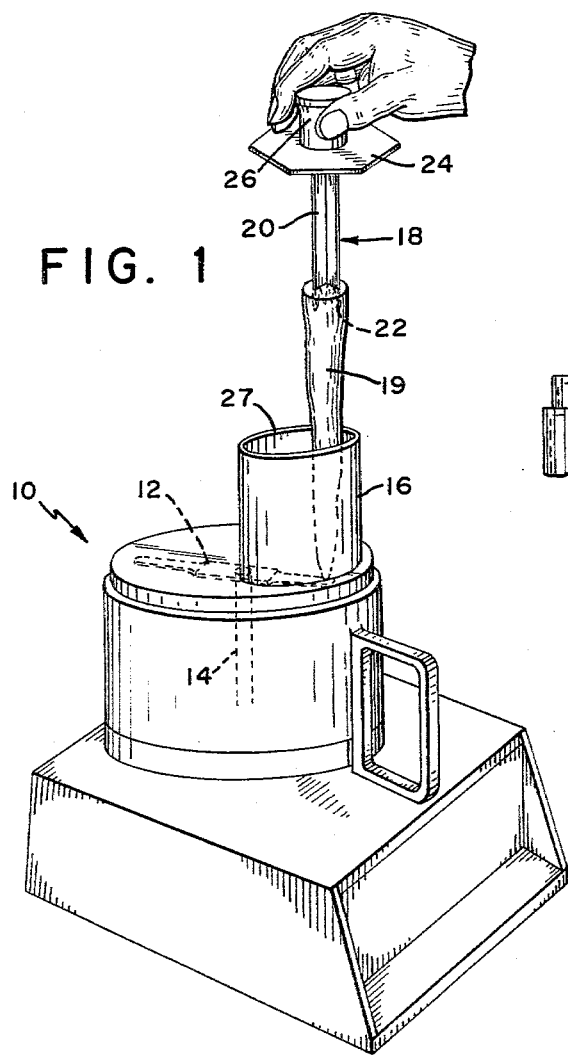
FIG. 1 is a perspective view of a typical food processing machine illustrating the use of the food holder accessory of the present invention.

As illustrated in FIG. 1, the holder accessory 18 of the present invention is used in conjunction with a food processing machine 10, primarily designed for use in household kitchens. Such kitchen type units generally comprise a base, which contains a motor and a bowl, which is usually transparent to permit observation of the food being processed, fitted onto the base. A feed tube formed on the lid allows passage of food to be processed to be introduced through the lid of the bowl. A pusher is used to push the food through the tube into contact with the slicing disk (or other processing element) situated in the bowl and connected to the motor. Generally, all units are equipped with a multipurpose S-shaped steel blade for blending, chopping, etc., and a plurality of special purpose disks, e.g. for slicing, shredding, etc. The motor of the processor may be activated by twisting the lid when the bowl is in position on the base, although a separate hand actuated switch may be provided in lieu of this activating means or in addition thereto.

For the most part, such processors have a direct drive wherein the blade or disk sits directly on top of the drive motor, although some units have a belt-driven mechanism to power the blade or disk. In the discussion of the invention, for purposes of facilitating the description, it will be understood that reference to a "slicing disk", to which element 12 in FIGS. 1 and 2 has particular reference, includes, as well, reference to other processing elements or blades that perform a variety of functions, e.g. shredding, blending, etc. As a precaution against injury, the food processor may be equipped with an interlock so that it cannot be operated unless the lid is in place and locked on the bowl. Food is introduced into the bowl through a feed tube formed on and extending upward a sufficient distance above the lid to preclude one's finger from reaching down a sufficient distance into the bowl to come into contact and be injured by a rotating blade or disk.

Figure 2:
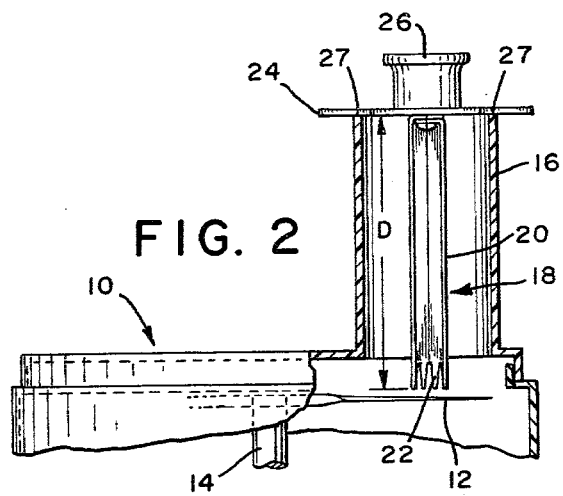
FIG. 2 is a fragmentary elevational view, partly in section, showing the relationship of the components with holder inserted to the hilt.

Referring again to the food processor 10 shown in FIGS. 1 and 2 of the drawing as it relates to the improved food item holder 18 of the present invention, it is seen that a rotatable element 12 mounted on a shaft 14 of the machine serves to slice certain foods such as vegetables, which are inserted into a feed tube or hopper 16 located above the rotary element 12. The feed tube 16 is generally of sufficient size to permit several vegetables to be sliced at once, thus it is ordinarily necessary to substantially fill the tube for effective operation of the machine.

The accessory of the present invention comprises a holder 18 for food to be inserted into the tube 16 and includes a prong assembly or other suitable means to hold the food item permitting it to be fully sliced or otherwise processed, as shown, a single vegetable, a carrot 19, is attached for slicing. The holder 18 comprises an elongated body portion 20 which is provided at one end with a plurality of prongs 22 for insertion into a vegetable for slicing, and at the other end is attached to a depth limit plate or hilt base 24 and a hangle 26 for manually feeding the vegetable into the slicer. The limit plate 24 extends transversely from the body 20 sufficiently to abut against the top edge 27 of the hopper 16 (FIG. 2) for the purpose of limiting the insertion of the body 20 into the hopper to a depth D, thereby preventing contact of the prongs 22 with the revolving element 12. It is important that the prongs 22 or other equivalent food item holding means be suitable to secure an item which is brittle or fragile, such as a celery stalk, and for this reason a plurality of slender yet sturdy prongs which complement each other in their retention capability are provided.

Figure 3:
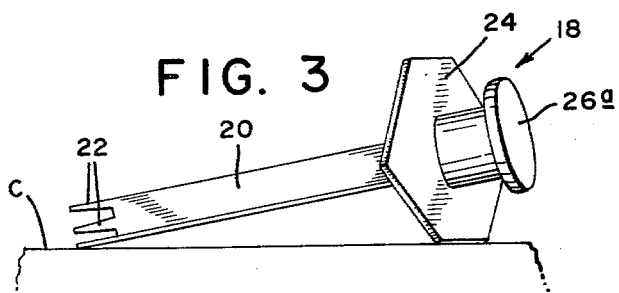
FIG. 3 is a perspective view of the holder accessory of the present invention.

The limit plate 24 may be of any suitable configuration by preferably having flat edges such as the hexagonal shape to prevent the accessory from rolling off the counter C as illustrated in Fig. 3.

Figure 4:
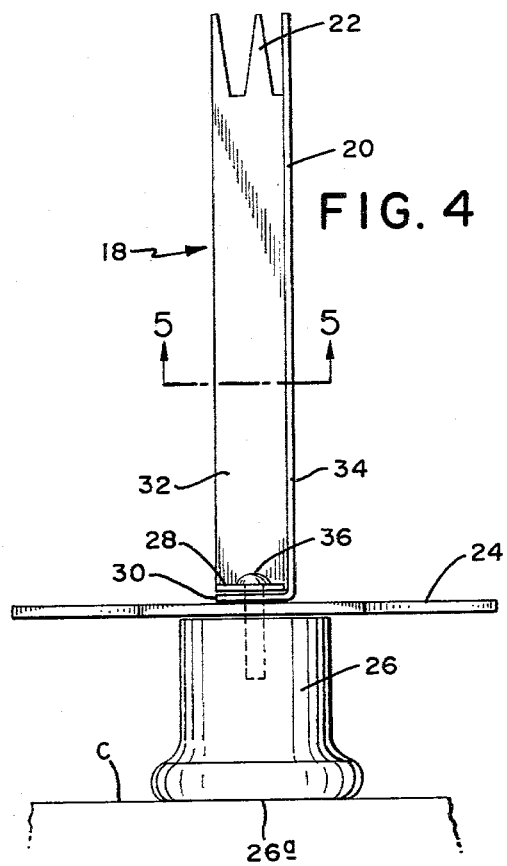
FIG. 4 is an elevational view of the holder with the bottom up.
Figure 5:
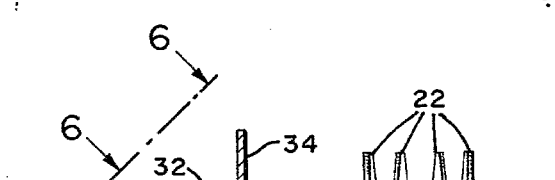
FIG. 5 is a sectional view taken along line 5—5 of FIG. 4.
Figure 6:
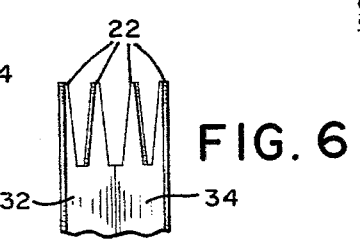
FIG. 6 is a view taken in direction 6—6 of FIG. 5.

The body 20 can be inexpensively fabricated from sheet metal preferably stainless steel with prongs 22 stamped in one end and two lips 28 and 30 formed at the other end so that when the body portion 20 is bent along its longitudinal central portion in the form of an angle, it comprises sides 32 and 34 (FIG. 5). In this embodiment, the lips 28 and 30 will overlap as shown in FIG. 4. The body can then be secured in an appropriate manner to the limit plate 24 and handle 26 by a drive pin 36 inserted through suitable holes in the lips 28 and 30, the limit plate 24 and handle 26.

Figure 7:
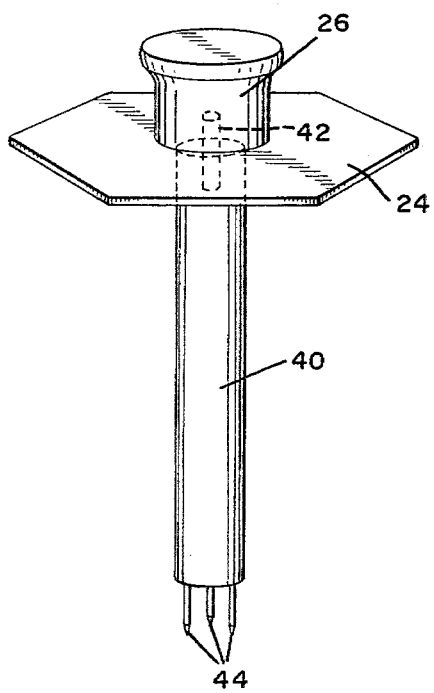
FIGS. 7-10 are perspective views of a holder accessory according to the invention showing alternate embodiments.

An alternative body construction is illustrated in FIG. 7 depicting the use of a rod 40 which is secured at its upper end by a pressed in dowel pin 42 in suitable holes in the rod 40, limit plate 24 and handle 26. Small stainless steel rods 44 sharpened at the lower end and press fitted in the lower end of the body 40, serve as the food item holding element.

Figure 8:
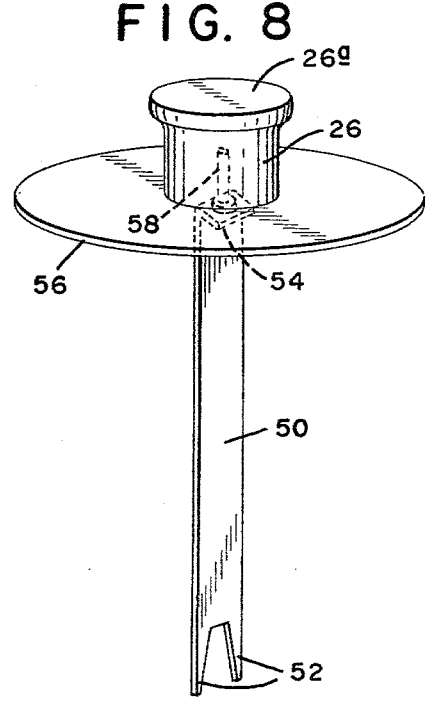

Still another modification is illustrated in FIG. 8 wherein the body 50 is fabricated from a narrow strip of sheet metal preferably stainless steel for sanitary advantage, having prongs 52 at the lower end and an integrally formed flange or lip 54 at the upper end for connecting by a pin 58 to a circular hilt base or limit plate 56 and handle 26. The knob 26 is constructed with a flat top surface 26a which can be useful in resting the accessory on a counter C in the manner shown in FIG. 4.

Figure 9:
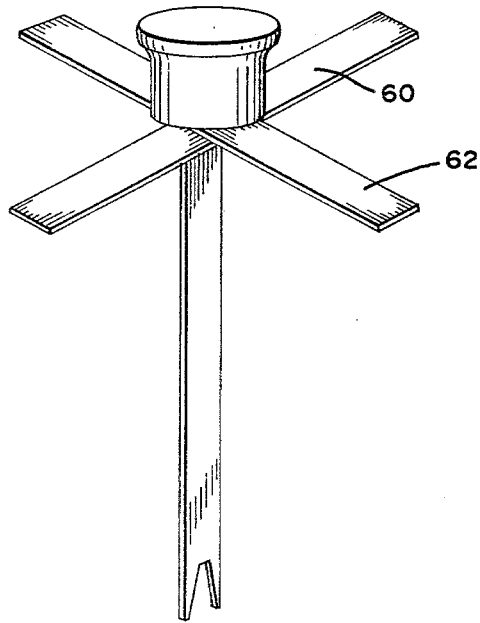

Still another embodiment is shown in FIG. 9 wherein the hilt base or limiting means comprises two crossed bars of sheet metal 60 and 62.

Figure 10:
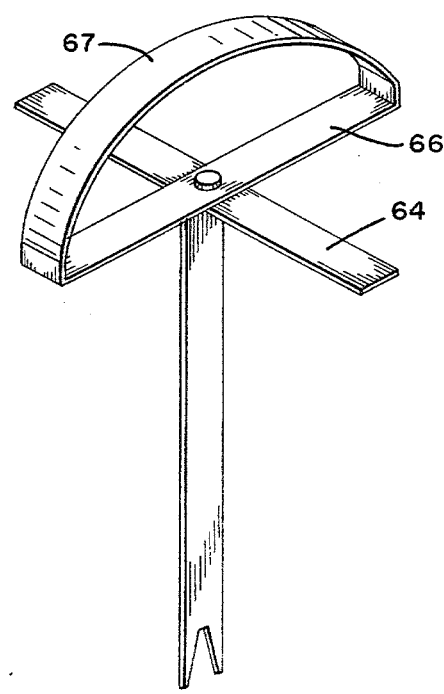

FIG. 10 illustrates still a further embodiment wherein crossed strips 64 and 66 are used as a limiting means and wherein the strip 66 is formed with an arcuate upper portion 67 to function as a handle.

A food item holder with length adjustments permitting the holder to be used with various processors having different feed tube lengths is described by reference to FIGS. 11-13.

The unit shown in FIG. 11 and 12 comprises the essential feature of the unit described by reference to FIGS. 1-16 except for the length adjusting feature.

As seen by reference to FIGS. 11 and 12, the elongated body portion designated 20 and comprising sides 32 and 34 in the embodiment of FIGS. 1-6 is formed into two parts; an upper part formed of sides 32a and 34a terminated in curved ends into which the lower part formed of sides 32b and 34b, respectively, fit in sliding relationship. Prongs at the bottom of 32b and 34b and a limit plate 24 and handle 26b, all similar to corresponding parts in FIGS. 1-6, are provided. To secure the upper part to the lower part in fixed relationship once the desired body portion length is selected, a suitable fastening arrangement comprising a hole 71 formed at the juncture of sides 32a and 34a in the upper part with a plurality of mating holes formed at the juncture of sides 32b and 34b of the lower part is provided. Upon selection of the desired length and alignment of hole 70 corresponding thereto with hole 71, the parts are securely held by an assemblage of threaded bolt 72 passing through the holes and secured with a knurled nut 76 on the end of the bolt 75. The outer block 73 and inner block 74 are preferably used to preclude any relative movement of the parts and assure a solid locked connection.

Reference to FIG. 13 illustrates an adjustable telescoping arrangement which except for its adjustable feature resembles the structure of FIG. 7. To provide the length adjusting feature, the lower part 40b is arranged to telescope within the upper part 40a. The desired length is obtained by the selection and alignment of one of the holes 81 in the lower part 40b with the hole 80 in the upper part 40a and securing the parts by means of a suitable locking bolt 82. The unit of FIG. 13 is provided with food retaining prongs 44a, a handle 26c and limit plate 24b which function in the manner described heretofore with reference to comparable parts.

The method for using the food item accessory of the invention is as follows: A long slender vegetable such as a carrot, cucumber, celery, etc., preferably having its end cut off, thereby forming a flat surface perpendicular to the length of the vegetable, is impaled at this flattened face, on the prongs of the slicing accessory so that the vegetable may be held firmly, and in suitable alignment. The end of the vegetable with the end cut off, is pushed onto the prongs of the slicer accessory, for the full length of the prongs, taking care that the extension support and the vegetable are in alignment on a common lengthwise axis. The food processor is turned on. With the slicing blade in the food processor rotating, the vegetable impaled at the end of the slicing accessory is then lowered down into the feed tube in a vertical manner, utilizing the support afforded by contact with that part of the wall of the feed tube that the direction of the slicing blade would force the food against. By means of this slicing accessory, the vegetable is firmly and steadily pushed down into the feed tube allowing it to be sliced. The holder 18 is prevented from being pushed further down into the feed tube when the limiting member 24 comes in contact with the upper open edge of the feed tube 27. When the holder 18 is withdrawn from the feed tube, only a small stub of the food item remains attached to the prongs. The length of the stub on the prongs will be approximately ⅛" longer than the length of the prongs. This gap between the ends of the holder prongs 22 and the slicer blade after the limit plate 24 is seated on top of this feed tube 27 is the safety factor margin to prevent the prongs from coming in contact with the slicing blade.

Having thus described the invention in considerable detail so that one skilled in the art may fully appreciate and derive full benefit from the improvement provided by the invention, it will be understood that the various details should not be unduly construed as limitations on the invention. Various changes and modifications may suggest themselves to one skilled in the art in the light of the disclosure and be encompassed within the present invention as defined by the subjoined claims.

I claim:

1. A device to hand hold an individual food item while such item is being processed through the feed tube of a motorized food processor which comprises
    a longitudinal shaft for insertion into said feed tube
    a food itemholding means comprising a plurality of food penetrating elements disposed in more than one plane formed on one end of said shaft
    a depth limiting element to span a feed tube opening to limit the insertion of said shaft into said feed tube said depth limiting element being secured on one of its sides to the other end of said shaft, and
    a handle secured on the opposite side of said depth limiting element.

2. The device of claim 1 wherein said shaft comprises an angled cross section.

3. The device of claim 1 wherein at least said shaft is formed of stainless steel.

4. The device of claim 1 wherein said element to limit the insertion of said shaft, is a polygon.

5. The device of claim 1 wherein said shaft is formed of stainless steel and said element to limit the insertion of said shaft, is a hexagon.

6. In a hand held device for holding an individual food item and feeding same within a feed tube of a household food processor in which food is processed by engagement with a rotary element, the improvement comprising: a metalic shaft in the form of an angled cross section, a food item retaining element comprising a plurality of prongs integrally formed in more than one plane on one end of said shaft, a hand holding portion provided at the opposite end of said shaft, and an insertion depth limiting element, which spans the feed tube opening, contiguous to the hand holding portion to limit the penetration of the shaft within said tube to preclude the possibility of engagement of the food retaining element with the rotating element of said food processor said hand holding portion comprising a flat top that permits said device to rest in an inverted vertical position on a flat surface.

7. The device of claim 6 in which the metallic shaft and retaining element are formed of stainless steel.

8. The device of claim 6 in which the shaft and food retaining element are integrally formed and comprise sheet metal bent so as to have a cross section of approximately 90 degrees.

9. The device of claim 7 wherein the depth limiting element comprises of a polygon plate.

10. The device of claim 1 wherein the shaft is adjustable in length.

11. The device of claim 2 wherein the shaft is adjustable in length.

12. The device of claim 1 wherein the shaft is tubular.

13. The device of claim 12 wherein the shaft is telescopic.

* * * * *